US008804158B2

(12) United States Patent
Vidal

(10) Patent No.: US 8,804,158 B2
(45) Date of Patent: Aug. 12, 2014

(54) TOKEN GENERATION FROM A PRINTER

(75) Inventor: Linus Vidal, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/116,908

(22) Filed: May 26, 2011

(65) Prior Publication Data

US 2012/0300246 A1 Nov. 29, 2012

(51) Int. Cl.
*G06K 15/00* (2006.01)
*G06F 3/12* (2006.01)

(52) U.S. Cl.
USPC .......................................... 358/1.14; 358/1.15

(58) Field of Classification Search
CPC .............................. G07B 17/00; G06F 21/645
See application file for complete search history.

(56) References Cited

U.S. PATENT DOCUMENTS

| | | | | |
|---|---|---|---|---|
| 6,862,583 | B1 * | 3/2005 | Mazzagatte et al. | 705/64 |
| 6,868,407 | B1 | 3/2005 | Pierce | |
| 7,480,806 | B2 | 1/2009 | Grawrock | |
| 8,468,582 | B2 | 6/2013 | Kuang et al. | |
| 2003/0182242 | A1 | 9/2003 | Scott et al. | |
| 2007/0245144 | A1 | 10/2007 | Wilson | |
| 2007/0276944 | A1 * | 11/2007 | Samovar et al. | 709/225 |

FOREIGN PATENT DOCUMENTS

WO 2008139469 11/2008

OTHER PUBLICATIONS

Wikipedia Two-factor authentication article available at http://en.wikipedia.org/wiki/Two-factor_authentication#Virtual_Tokens, no apparent publication date.
RSA secur-ID product available at http://www.rsa.com/node.aspx?id=1156, no apparent publication date.
Verisign authentication services described at http://www.verisign.com/, no apparent publication date.
EMC Corp, "RSA SeourlD," available Apr, 22, 2011, <http://web.archive.org/web/20110422002459/http://rsa.cominode.aspx?id=1156>.
RSA Security Inc, "RSA®SecurlD Two-factor Authentication," RSA Solution Brief, 2010, <http://web.archive.org/web/20110427052350/http://www.rsa.com/products/securid/sb/10695_SIDTFA_SB_0210.pdf>.
Sestus, "Sestus Virtual Tokens," available Feb. 8, 2011, <http://web.archive.org/web/20110208191618/https://www.sestus.com/>.
Sestus, "Welcome to Virtual Token authentication: Multi-Factor Authentication to the World," available Jan. 30, 2010, <http://web.archive.org/web/20100130011130/http://www.sestus.com/vt/>.

(Continued)

*Primary Examiner* — Dov Popovici

(57) ABSTRACT

Examples described herein relate to accessing an identity certificate with a printing device based on validation information obtained from a user. Examples include generating, with the printing device, a token based at least in part on the identity certificate, and the token incorporating constraint data. Examples further include printing the token having the identity certificate and the constraint data.

20 Claims, 4 Drawing Sheets

(56) References Cited

OTHER PUBLICATIONS

Symantec Corp, "Secure Sockets Layer (SSL): How It Works," Feb. 16, 2011, <http://web.archive.org/web/20110216132233/http://www.verisign.com/ssl/ssi-information-center/how-ssi-security-works/index.html>.

Symantec Corp, "SSL Certificates," available Feb. 16, 2011, <http://web.archive.org/web/20110216132223/http://www.verisign.com/ssl/index.html>.

VeriSign, Inc., "Beginners Guide to SSL Cetficates: Making the Best Choice When Considering Your Online Security Options," 2010, <http://web.archive.org/web/20110109200923/http://www.verisign.com/ssl/ssl-information-center/ssl-resources/guide-ssl-beginner.pdf>.

Wikipedia, "SecurID," available Feb. 15, 2010, <http://web.archive.org/web/20100215212709/http://en.wikipedia.org/wiki/SecurID>.

Wikipedia, "Two-factor authentication," available May 12, 2011, <http://web.archive.org/web/ 20110512211028/http://en.wikipedia.org/wiki/Two-factor_authentication>.

* cited by examiner

TOKEN GENERATION FROM A PRINTER

BACKGROUND

A token is something that indicates authority, proof and/or authenticity. An example of a token is an admission ticket (e.g., a movie ticket, concert ticket, etc.). A credit card is another example of a token—the card establishes authority to access money held by a financial institution. Tokens typically contain data and/or unique identification and can be physical or electronic.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Two-factor authentication seeks to decrease the probability that the requestor is presenting false evidence of its identity. Two-factor authentication implies the use of two independent means of evidence to assert an identity. "Something one has", "something one knows", and "something one is" are examples of three independent factors. Using these examples, tokens are indicative of "something one has."

Traditional use of physical tokens (e.g., credit cards, admission tickets, etc.) presents a variety of problems. For example, physical tokens are typically issued by a third-party (e.g., bank, ticket agency, etc.). In some cases, replacing a lost token requires contacting the third party issuer of the token to obtain a replacement token (e.g., by mail). Loss of a token may also require contacting the third-party to cancel the lost token so that it cannot be used by anyone else. Contacting the third-party can be time consuming and/or burdensome.

Another problem with both physical and electronic tokens is that they are often easily copied. Sophisticated third-parties may be able to include security enhancements to prevent copying of tokens. However, relying on third-parties to generate and issue tokens poses additional security risks because the centralized systems, processes and mechanisms for generating and issuing tokens become attractive targets for would-be hackers, counterfeiters, thieves, etc.

Mobile devices (e.g., mobile phones, etc.) can be used as token generation devices (e.g., via mobile signatures created on a subscriber identification module, or SIM, card). However, mobile devices, like other physical tokens, are also subject to loss and theft. In addition, electronic mobile devices are subject to malware, man-in-the-middle attacks, and can be costly to deploy and support.

Embodiments described herein present methods and systems for a printing device (e.g., a home or office printer) to generate and issue tokens. These tokens may contain embedded information (e.g., custom constraints) and may be authenticated and encrypted, as needed.

Figure 1:
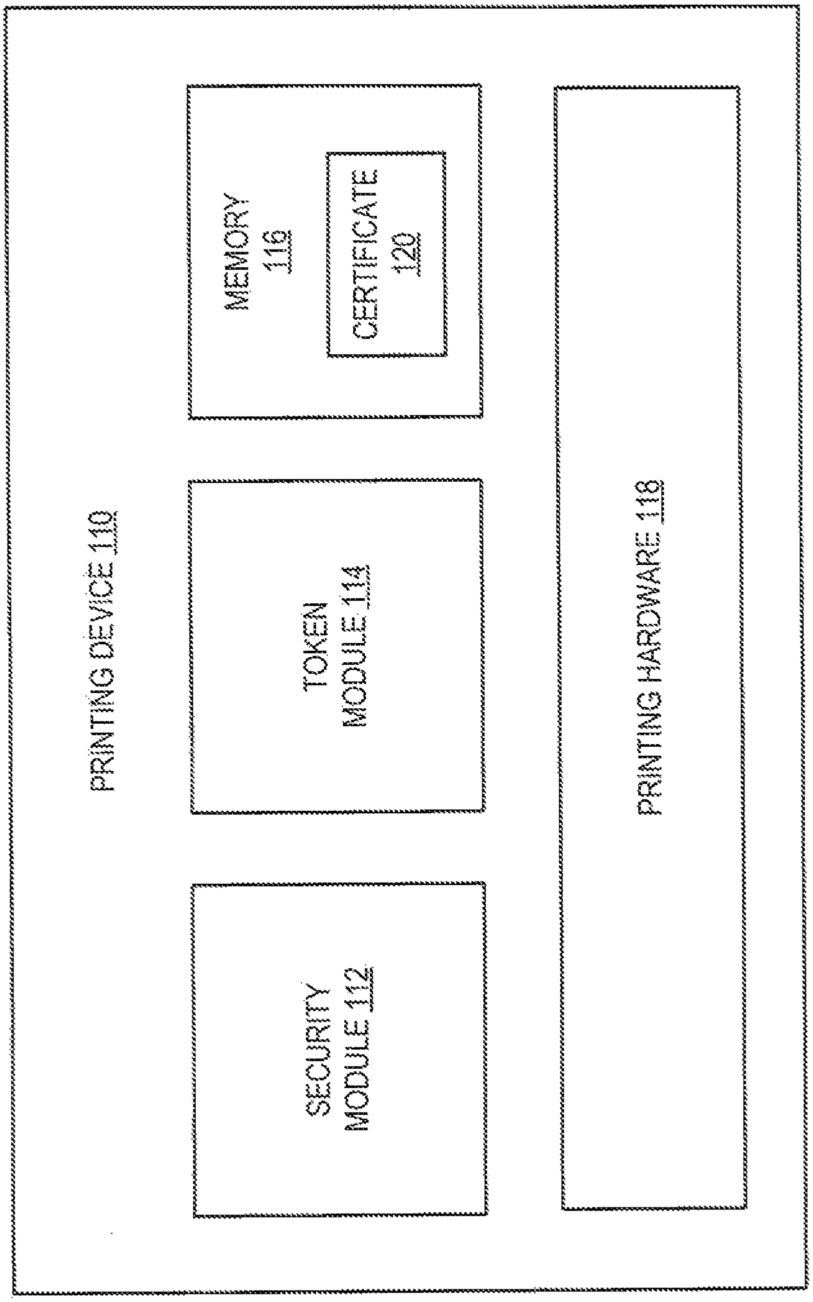
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Printing device 110 can be any personal printing device. While a personal printing device may be accessible to more than one person (e.g., a home printer shared by a family), a personal printing device, as defined herein, may not include printing devices that are generally accessible (e.g., in public, in an office environment, etc.).

Printing device 110 includes a memory 116 to store an identity certificate 120. Identity certificate 120 is unique to printing device 110. For example, identity certificate 120 may be based on a unique device ID (identification). Printing device 110 may store more than one unique identity certificate. In various embodiments, memory 116 (or a portion of memory 116 where certificate 120 is located) is a secure memory, inaccessible except by user authentication.

Security module 112 obtains validation data from a user to access identity certificate 120 in memory 116. Validation data may include a password, biometric data or other suitable data. For example, when a user purchases a new printing device (e.g., printing device 110), the initial setup of the device may include establishing validation data to access one or more identity certificates pre-installed on the new device. In the case of biometric data (e.g., fingerprint scan), it may be necessary to provide the biometric data directly to the device (e.g., via a fingerprint scanner on the printing device). In the case of password data the password may be accepted via direct user input on a user interface of the personal printing device.

Token module 114 generates a token that incorporates the accessed (via validation data from the user) identity certificate 120. As part of the token generation, the user may provide constraint data to incorporate into the token. For example, constraint data might include "time to live" data that defines a period of time during which the token is valid. In the case of a financial token (e.g., that provides access to money held in a financial institution), constraint data might include a spending limit. In yet another example, constraint data might include an image of the user that limits use of the token to that user. Other suitable types of constraint data could also be incorporated in the token. In addition, more than one type of constraint data could be orporated into the same token.

Printing hardware 118 is capable of printing the token generated by token module 114 onto a medium (e.g., paper). The token could be printed as plain text, an image, a two-dimensional barcode, a QR (quick response) code or other suitable format.

Figure 2:
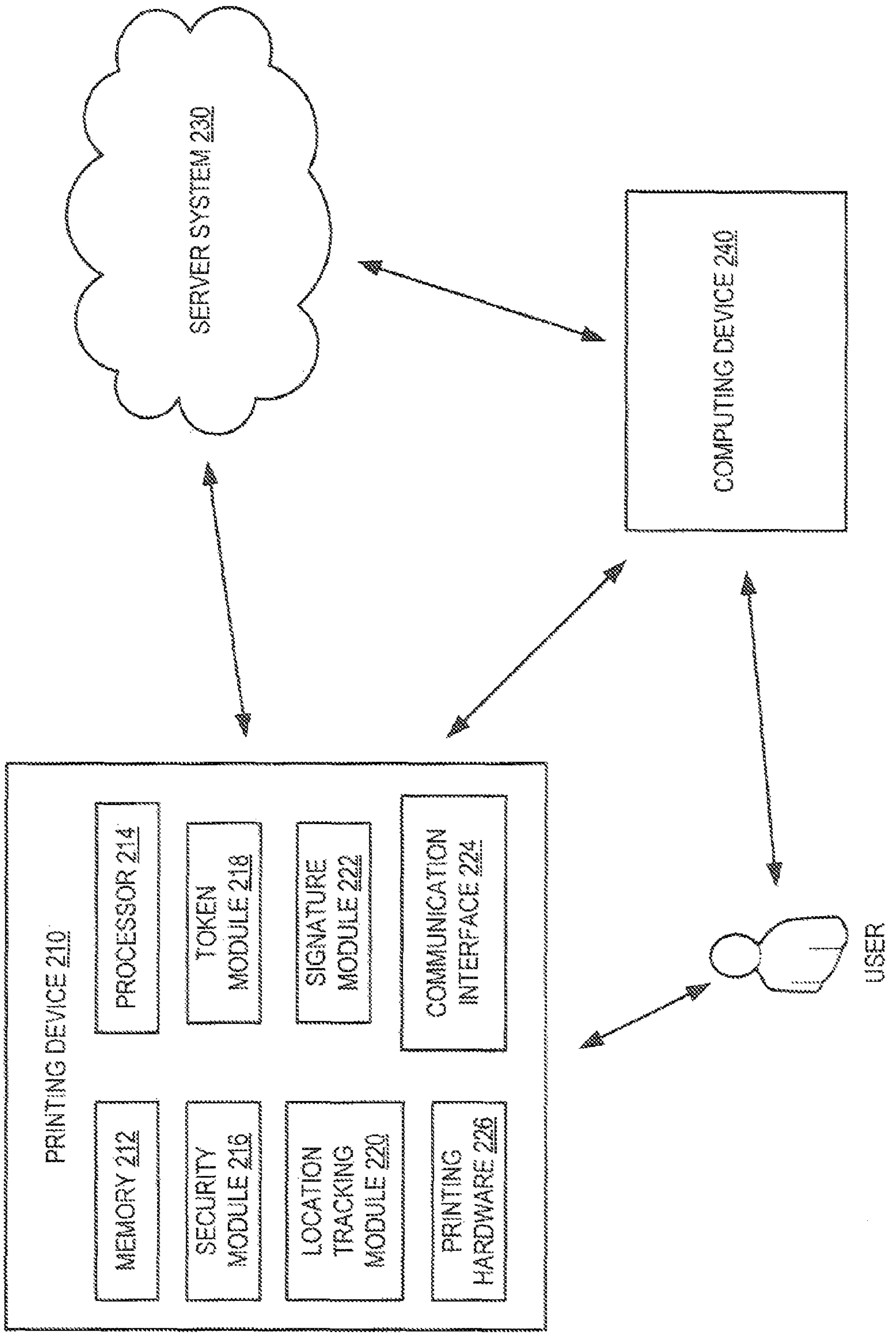
FIG. 2 is a block diagram illustrating a system according to various embodiments.

FIG. 2 is a block diagram illustrating a server system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Printing device 210 includes a memory 212 to store an identity certificate unique to printing device 210. For example, the identity certificate may be based on a unique device ID (identification). Printing device 210 may store more than one unique identity certificate. In various embodiments, memory 212 (or a portion of memory 212 where the certificate is located) is a secure memory, inaccessible except by authentication via user validation data.

Security module 216 obtains validation data from a user to access the identity certificate in memory 212. Validation data may include a password, biometric data or other suitable data. In the case of biometric data (e.g., fingerprint scan), it may be necessary to provide the biometric data directly to the device (e.g., via a fingerprint scanner on the printing device). In the case of password data, the password may be accepted via direct user input on a user interface of the personal printing device. In certain embodiments, printing device 210 may accept validation data from a computing device 240 operatively connected (e.g., physical connection, wireless connection, network connection, etc.) to printing device 210. Computing device 240 could be any computing device including desktops, notebooks, smartphones, tablets, or the like.

Printing device 210 includes a communication interface 224 that provides web-connectivity including connectivity to server system 230. In various embodiments, printing device 210 is registered to the user on server system 230. Server system 230 may provide a web-interface for the user to manage profile settings, printer configuration settings and/or other parameters. The web-interface may be accessible directly on printing device 210 or by computing device 240 or both. The web-interface may be used to provide validation data for accessing the identity certificate in memory 212.

Location tracking module 220 tracks the location of printing device 220. Location tracking could be performed by GPS (Global Positioning Satellite), IP (Internet Protocol) address, or other suitable mechanism. In certain embodiments, access to the identify certificate is based on the location of printing device 210 in addition to the user-provided validation data. For example, access to the identity certificate may only be granted (regardless of validation data) if it is confirmed that printing device 210 is located within a pre-defined geographic area (e.g., per user configuration). Given that printers are often kept and used in a fixed location, an attempt to access the identify certificate outside the pre-defiled geographic area may be an unauthorized access attempt (e.g., stolen printing device). In this way, providing the location data from location tracking module 220 to security module 216 may improve the security of the token generation capabilities of printing device 210.

Token module 218 generates a token that incorporates the accessed identity certificate. As part of the token generation, the user may provide constraint data to incorporate into the token. As with other user input, the constraint data may be provided directly via a user interface on printing device 210 or at may be provided via an interface (e.g., web-interface on computing device 240. For example, constraint data might include "time to live" data that defines a period of time during which the token is valid. In an example involving a financial token (e.g., that provides access to money held in a financial institution), constraint data might include a spending limit. In yet another example, constraint data might include an image of the user that limits use of the token to that user. Other suitable types of constraint data could also be incorporated into the token. In addition, more than one type of constraint data could be incorporated into the same token.

As part of the token generation process, signature module 222 signs the token with a key. The key may be a private key of printing device 210 or a public key of a third-party. In some embodiments, signature module 222 can sign the token with a combination of keys. In the case of a third-party public key, signature module 222 may obtain the public key from server system 230 or directly from the third-party.

Printing hardware 226 is capable of printing the taken generated by token module 218 onto a medium (e.g., paper). In some embodiments, printing device 210 may provide the token to the user in electronic form (e.g., via email or other electronic communication).

Various modules and/or components illustrated in FIG. 2 may be implemented as a computer-readable storage medium containing instructions executed by a processor (e.g., processor 214) and stored in a memory (e.g., memory 212) for performing the operations and functions discussed herein.

Figure 3:
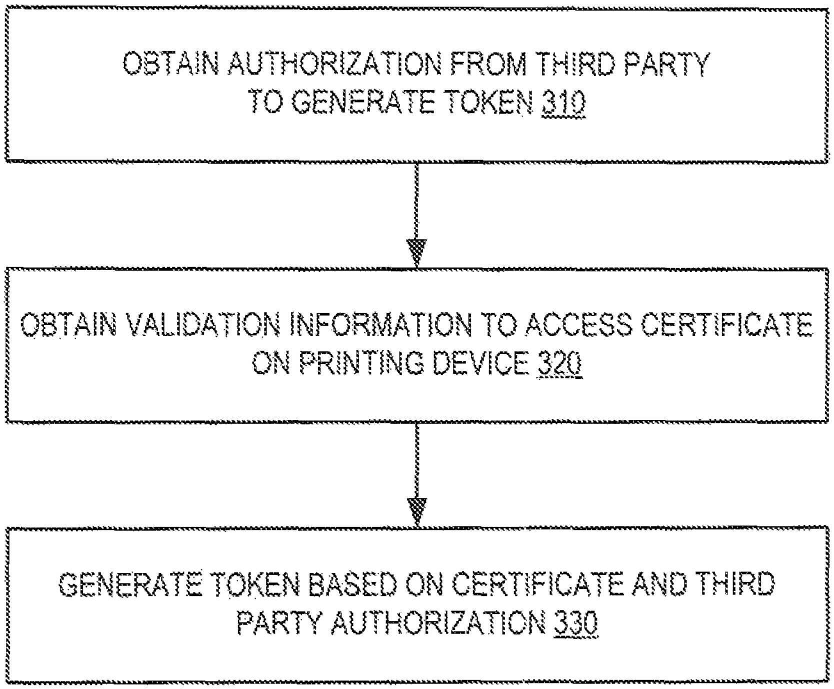
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

The printing device obtains 310 authorization from a third-party to generate a token. The authorization is obtained via network connection (e.g., Internet). The token might be an admission ticket to a concert or sporting event; or the token could be a security badge to gain access to a restricted building; or the token could be a payment token that grants access to money held in a third-party financial institution. Other types of tokens for use in establishing authenticity, authority, etc. could also be requested.

A request for authorization could originate from a user via a user interface on the printing device. For example, the printing device might have an application widget, or "app," that allows a user to generate a token request. Based on this request, the printing device requests authorization from the third-party. A request could also originate from a user via a remote computing device (e.g., desktop, notebook, smartphone, tablet, etc.). For example, the user might access a web interface on a remote computing device and send the request to the printing device over the Internet (e.g., via direct connection with the printing device or via a server). The printing device then requests authorization from the third-party. Additionally, the user might make the request directly to the third-party from a remote computing device (e.g., via a website, web service, etc.), causing the third-party to send authorization to the printing device (e.g., based on information received from the user about how to contact the printing device).

The printing device obtains 320 validation information from a user to access a certificate stored on the printing device. The certificate can be any electronic document or data that uniquely ties itself to an identity (e.g., the user). For example, a certificate could be an electronic document that uses a digital signature to bind a key with the user's identity. The certificate may be associated with a unique device ID for the printing device. While printing devices are often kept in a relatively secure physical location (a person's home), the requirement of providing validation data to access the certificate (and subsequently generate a token using the certificate) further enhances the security of the token generation process. Validation data might include a password, biometric data, or other information unique to the user/owner of the printing device.

Based on the third-party authorization and the appropriate user validation data, the printing device generates 330 a taken. The token may be represented by a barcode, a QR code, plain text, a sequence of numbers, an image, some combination of these or other visual representations.

Figure 4:
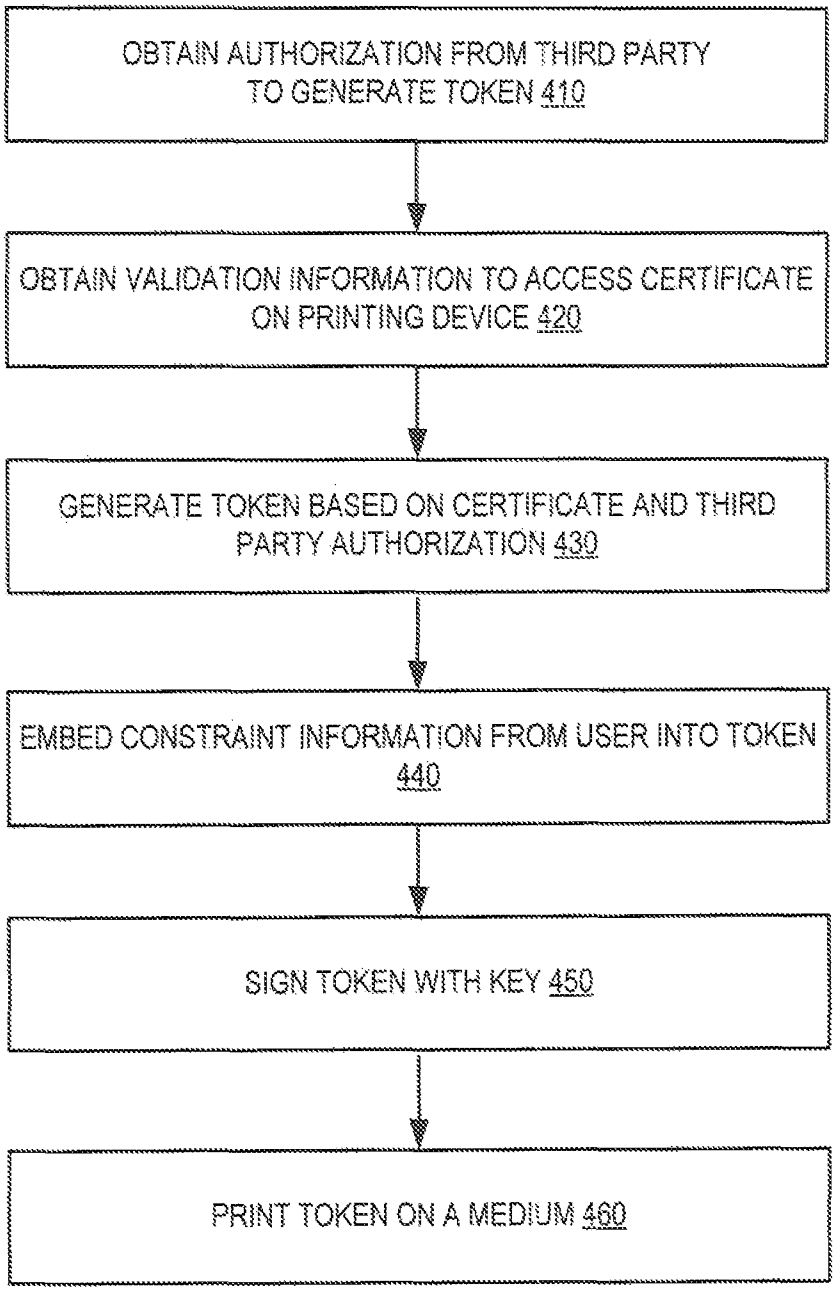
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

The printing device obtains 410 authorization from a third-party to generate a token. The authorization is obtained via network connection (e.g., Internet). A request for authorization could originate from a user via a user interface on the printing device. For example, the printing device might have an application widget, or "app," that allows a user to generate a token request. Based on this request, the printing device requests authorization from the third-party. A request could also originate from a user via a remote computing device (e.g., desktop, notebook, smartphone, tablet, etc.). For example, the user might access a web interface on a remote computing device and send the request to the printing device over the Internet (e.g., via direct connection with the printing device or via a server). The printing device then requests authorization from the third-party. Additionally, the user might make the request directly to the third-party from a remote computing device (e.g., via a website, web service, etc.), causing the third-party to send authorization to the printing device (e.g., based on information received from the user about how to contact the printing device).

The printing device obtains 420 validation information from a user to access a certificate stored on the printing device. The certificate can be any electronic document or data that uniquely ties itself to an identity (e.g., the user). For example, a certificate could be an electronic document that uses a digital signature to bind a key with the user's identity. The certificate may be associated with a unique device ID for the printing device. Validation data might include a password, biometric data, or other information unique to the user/owner of the printing device.

Based on the third-party authorization and the appropriate user validation data, the printing device generates 430 a token. The token may be represented by a barcode, a QR code, plain text, a sequence of numbers, an image, some combination of these or other visual representations.

As part of the token generation (or a post-generation modification of the token), a user or third-party may provide constraint data for the token to the printing device. The printing device embeds 440 this constraint data into the token. For example, the user may wish to create a temporary credit card to be used on a business trip. Thus, the user might provide time constraints (e.g., define a specific period of time during which the temporary credit card is valid), spending constraints (e.g., a per transaction spending cap or a total spending cap), geographic constraints (e.g., specific or general locations where the temporary credit card is valid), or other suitable constraints. In another example, the user may wish to generate a secure admission ticket to an event. In this case, the user might provide or select an image of herself/himself to be incorporated into the ticket. In this way, the ticket is only valid for entry to the event if the image on the ticket matches the face of the ticket holder. The constraint data may be self-evident by observing the token or the token may include a reference for accessing the constraint data (e.g., at a network location).

Constraint data may be provided to the printing device via an "app" accessible by a user interface on the printing device. Constraint data could also be provided remotely. For example, the user could login to a website hosted by a server system having a connection to the printing device. From this website, the user might manage various printer configuration settings, profile settings, etc., including updating constraint data for a particular requested token. In addition, if the token relates to a third-party, the third-party might also provide constraint data to be embedded in the token.

The printing device signs 450 the token with a key. The key may be a private key of the printing device or a public key of the third-party. The token could also be signed with a combination of keys. In the case of a third-party public key, the printing device may obtain the public key via network connection (e.g., from a server system to which the printing device is registered or directly from the third party).

In various embodiments, the printing device prints 460 the token on a medium. While there may be many advantages to printing the token, in some embodiments, the printing device can provide the token to the user in electronic format (e.g., via direct wi-fi connection with the printing device, via email, etc.). While generation of the token is unique to the printing device, a token received in electronic format could be printed on a different printing device in certain embodiments.

Various modifications may be made to the disclosed embodiments and implementations of the invention without departing from their scope. Therefore, the illustrations and examples herein should be construed in an illustrative, and not a restrictive sense.

What is claimed is:

1. A printing device, comprising:

a memory to store an identity certificate that is unique to the printing device;

a security module to obtain validation data from a user to access the identity certificate;

a token module to generate a token incorporating the accessed identity certificate, wherein the token is constrained based at least in part on constraint data that is provided to the printing device and incorporated into the token; and printing hardware capable of printing the token having the incorporated accessed identity certificate and incorporated constraint data on a medium.

2. The printing device of claim 1, wherein the printing device is registered to the user on a server system.

3. The printing device of claim 2, further comprising:

a signature module to sign the token with a key prior to printing the token on the medium.

4. The printing device of claim 3, further comprising:

a communication interface to enable communication with the server system over a network; and wherein the key is obtained from the server system via the communication interface.

5. The printing device of claim 1, wherein the validation data comprises a password or biometric data.

6. The printing device of claim 1, wherein the constraint data comprises time to live data.

7. The printing device of claim 1, further comprising a location tracking module to identify a location of the printing device; and the security module further to grant access to the identity certificate based on the location of the printing device in addition to the validation data.

8. The printing device of claim 1, wherein the accessed identity certificate is associated with a unique device ID for the printing device, and the token printed on the medium incorporates the accessed identity certificate and the incorporated constraint data.

9. The printing device of claim 1, wherein the constraint data is self-evident by observing the token printed on the medium.

10. The printing device of claim 1, wherein the token printed on the medium includes a reference for accessing the constraint data.

11. A method performed by a printing device, comprising:

obtaining, via network connection, authorization from a third-party to generate a token at the printing device, the token to be presented to the third-party;

obtaining validation information from a user to access an identity certificate that is unique to the printing device stored on the printing device;

generating the token based at least in part on the identity certificate and the authorization from the third-party, wherein generating the token includes incorporating constraint data into the token; and printing the token having the incorporated constraint data and the identity certificate on a medium.

12. The method of claim 11, wherein generating the token further comprises:

the printing device embedding the incorporated constraint data into the token.

13. The method of claim 11, wherein generating the token further comprises:

the printing device signing the token with a public key of the third-party.

14. The method of claim 11, wherein generating the token further comprises:

the printing device signing the token with a private key of the printing device.

15. The method of claim 11, wherein the validation information comprises a password or biometric data.

16. A non-transitory computer-readable storage medium containing instructions that, when executed, cause a printing device to:

obtain validation data from a user to access an identity certificate, which is unique to the printing device, stored in memory;

generate a token incorporating the accessed identity certificate, wherein the token is constrained based at least in part on received constraint data and generating the token includes incorporating constraint data into the token; and print the token having the incorporated accessed identity certificate and the incorporated constraint data on a medium.

17. The computer-readable storage medium of claim 16, wherein the printing device is registered to the user on a server system.

18. The computer-readable storage medium of claim 16, comprising further instructions that cause the printing device to:

sign the token with a key prior to printing the token on the medium.

19. The computer-readable storage medium of claim 18, wherein the instructions that cause the printing device to sign the token with the key comprise further instructions that cause the printing device to:

obtain the key from a server system via a communication interface.

20. The computer-readable storage medium of claim 16, comprising further instructions that cause the printing device to:

grant access to the identity certificate based on a location of the printing device in addition to the validation data.

* * * * *